United States Patent [19]
Werner

[11] Patent Number: 5,866,056
[45] Date of Patent: Feb. 2, 1999

[54] METHOD OF FORMING A GASKET WITH CENTERING COLLAR

[76] Inventor: Michael Werner, Tulpenweg 6, 85635 Hohenkirchen-Siegertsbrunn, Germany

[21] Appl. No.: 759,343

[22] Filed: Dec. 3, 1996

[30] Foreign Application Priority Data

Dec. 5, 1995 [DE] Germany ................. 195 45 373.5

[51] Int. Cl.[6] .................................................. C04B 35/00
[52] U.S. Cl. .................... 264/104; 264/105; 264/294; 264/320; 264/322
[58] Field of Search .................. 264/104, 105, 264/294, 320, 322, 325

[56] References Cited

U.S. PATENT DOCUMENTS

| | | |
|---|---|---|
| 1,872,482 | 8/1932 | Messing . |
| 2,990,206 | 6/1961 | Bagdon . |
| 3,194,860 | 7/1965 | Ehrreich .................... 264/104 |
| 3,230,290 | 1/1966 | Nelson ....................... 264/320 |
| 3,549,445 | 12/1970 | McMahon .................. 264/322 |
| 3,929,341 | 12/1975 | Clark .......................... 277/134 |

FOREIGN PATENT DOCUMENTS

| | | |
|---|---|---|
| 4038592 A1 | 6/1991 | Germany . |
| 1234407 | 6/1971 | United Kingdom . |
| 89/11608 | 11/1989 | WIPO . |

OTHER PUBLICATIONS

Literature: "Expanded PTFE Gaskets," Konstruktion, dated Nov. 1993, pp. A49 (No Translation).

*Primary Examiner*—Christopher A. Fiorilla
*Attorney, Agent, or Firm*—Carol A. Lewis White

[57] ABSTRACT

The invention concerns a process for production of a seal using a compactable sealing material, especially a fluoropolymer, to seal flanges, preferably matching flanges, especially to produce a ring packing to seal flange connections for pipes, in which the seal is provided on the outer and/or inner periphery with a centering collar or with several centering collar sections spaced around the periphery. The invention also concerns an apparatus to produce a seal using a compactable sealing material, especially a fluoropolymer, to seal flanges, preferably matching flanges, especially an apparatus to produce a ring packing to seal flange connections for pipes, in which the seal is provided on the outer and/or inner periphery with a centering collar with several centering collar sections spaced around the periphery, and preferably an apparatus to execute the process according to the invention.

12 Claims, 8 Drawing Sheets

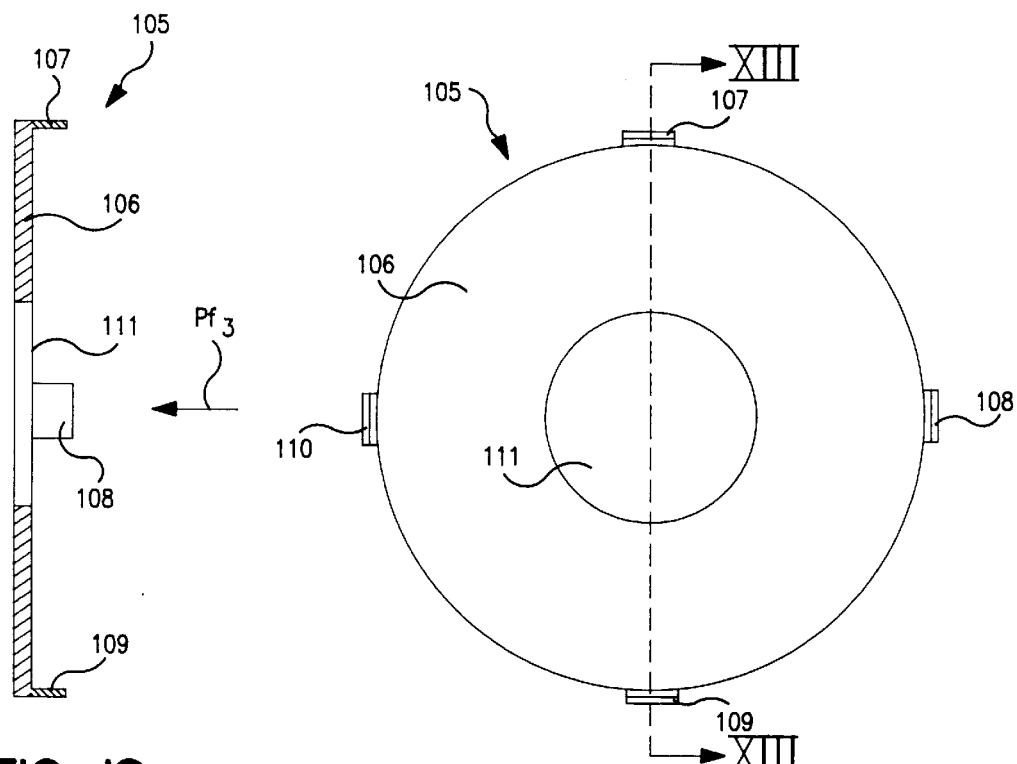
FIG. 12
FIG. 13
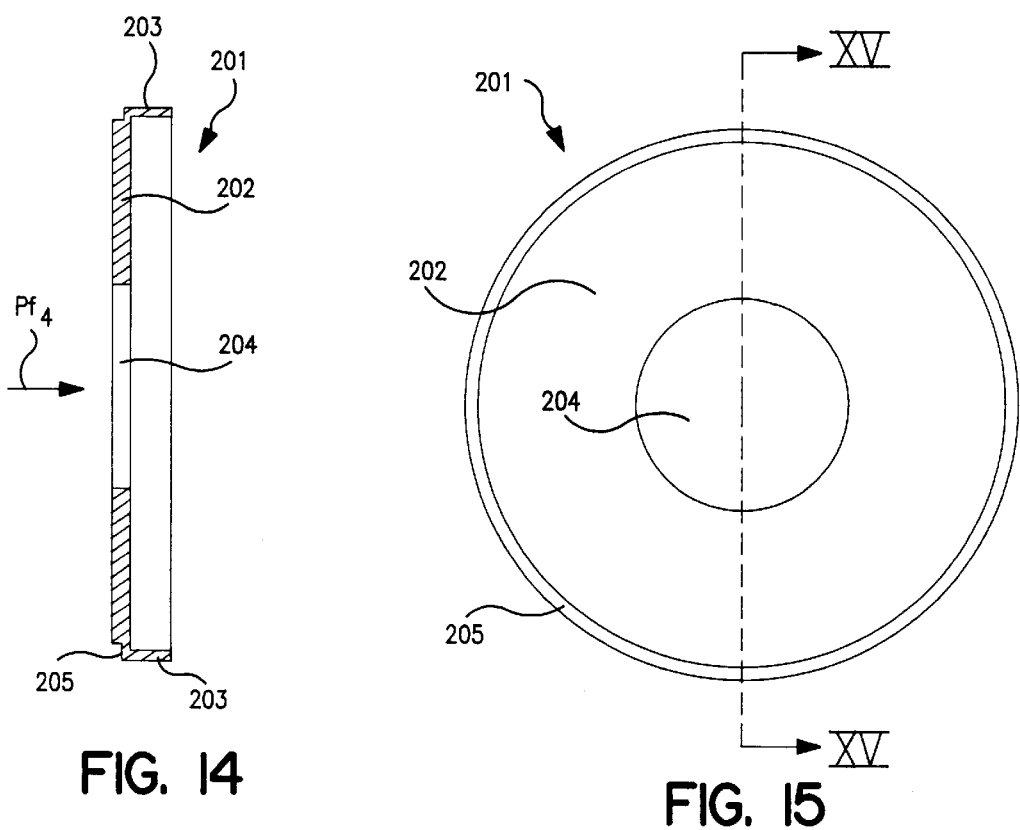
FIG. 14
FIG. 15

METHOD OF FORMING A GASKET WITH CENTERING COLLAR

FIELD OF THE INVENTION

The invention concerns a process for production of a seal using a compactable sealing material, especially a fluoropolymer, to seal flanges, preferably matching flanges, especially to produce a ring packing to seal flange connections for pipes, in which the seal is provided on the outer and/or inner periphery with a centering collar or with several centering collar sections spaced around the periphery.

The invention also concerns an apparatus to produce a seal using a compactable sealing material, especially a fluoropolymer, to seal flanges, preferably matching flanges, especially an apparatus to produce a ring packing to seal flange connections for pipes, in which the seal is provided on the outer and/or inner periphery with a centering collar with several centering collar sections spaced around the periphery, and preferably an apparatus to execute the process according to the invention.

BACKGROUND OF THE INVENTION

Seals to seal flanges, especially ring packings to seal flange connections on two pipes being connected, for example, gas pipes or the like, are already known.

The relevant prior art is explained, for example, with reference to FIG. 9. This essentially depicts a flange connection 70 for pipes in which two pipe elements being joined end to end, namely a first pipe element 71 and a second pipe element 72, are to be sealed together. The first pipe element 71 has a corresponding first pipe flange 75 with a first outer periphery 77 and the second pipe element 72 has a corresponding second pipe flange 76 with a second outer periphery 78. A ring packing 84, for example, made of a fibrous material, is situated in the region between the pipe flanges 75 and 76 facing each other end to end. The first pipe flange 75 and the second pipe flange 76 of flange connection 70 are held in a pressed together position by means of an arrangement in which this arrangement consists essentially of a first pressure disk 79 connected to the first pipe flange 75 and a second pressure disk 80 connected accordingly to the second pipe flange 76. The first pressure disk 79 and second pressure disk 80 are joined by means of a clamping bolt 81, which passes through corresponding holes of the first pressure disk 79 and the second pressure disk 80 and is fastened by means of a first nut 82 connected to the first pressure disk 79 and a second nut 83 connected to the second pressure disk 80. Centering of ring packing 84 is essential for proper function of the ring packing 84 in the region of flange connection 70, in which according to the prior art explained with reference to FIG. 9 this centering occurs by means of a clamping bolt 81. To accomplish this the ring packing 84 is provided on the outside periphery with a centering edge 85 that comes in contact with clamping bolt 81. To achieve this type of centering, however, the ring packing 84 is displaced radially in the region of the pipe flanges 75 and 76 facing each other so that, on the one hand, a first dead space 86 is produced in the region of an opening 89 of ring packing 84 opposite a cylindrical inside periphery 73 of the first pipe element and a cylindrical inside periphery 74 of the second pipe element 72, whereas, on the other hand, a projection 87 of the ring packing 84 corresponding to the first dead space 86 is present in the region of the cylindrical inside periphery 73 or the cylindrical inside periphery 74. Owing to this centering, as shown in FIG. 9, a second dead space 88 is also produced on the opposite peripheral region 77, 78 of flange connection 70, i.e., the ring packing 84 is displaced inward in the radial direction by a certain distance opposite the first pipe flange 75 and the second pipe flange 76. However, in the flange connection according to the prior art apparent from FIG. 9 precise centering of the ring packing 84 is not possible owing to the relatively high tolerances. Because of the dead spaces occurring in such an arrangement, for example, dead spaces 86 and 88, as well as the protrusion 87 of ring packing 84, an adverse effect and narrowing in the inside diameter of flange connector 70 occurs. Another shortcoming results from the dead spaces produced by rebound of ring packing 84 between the first pipe flange 75 and the second pipe flange 76, i.e., the first dead space 86 and the second dead space 88.

Ring packings for flange connections for pipes are also known that consist of turned parts, i.e., parts that are turned from the solid material, in which a corresponding centering edge is turned on the ring packing. The drawback of such known seals consists of the fact that the choice of material for this purpose is limited and they are extremely costly to manufacture. For example, so-called collar seals are known that are turned from sintered polytetrafluoroethylene.

Seals consisting of molded materials to seal flat surfaces are also known in which the materials employed for this purpose exhibit greater thicknesses and as a result lead to sealing drawbacks, especially high cold flow and poor chemical resistance.

Finally, seals produced from several individual parts are known, for example, ring packings to seal a flange connection of two glass tubes according to DE-U 92 05 669.5. These known seals consist, in particular, of a thin plastic film, for example, a film of stretched, microporous polytetrafluoroethylene, in which this film is tightened in a mounting or attachment ring and glued or sealed to this ring or mechanically attached to this ring. The shortcomings of such seals composed of several individual parts consist of the high manufacturing costs, the relatively wide centering edge and, in the case of a glued joint with the outer mounting or attachment ring, relatively poor chemical resistance of the resulting ring packing.

Relative to the prior art just outlined the underlying task of the present invention is to provide an improved process for manufacturing a seal using a compactable sealing material, especially a fluoropolymer, to seal flanges, preferably matching flanges (for example, flat or spherical), especially a process for manufacturing a ring packing to seal flange connections for pipes, in which this seal is provided on the outer and/or inner periphery with a corresponding centering collar.

SUMMARY OF THE INVENTION

The present invention is directed to a new process for producing a seal using a compactable sealing material, especially a fluoropolymer, to seal flanges, especially to produce a ring packing to seal flange connections for pipes. Particularly, it is prescribed that to form a centering collar or to form several centering collar sections spaced around the periphery, a stipulated outer and/or inner edge region or several stipulated outer and/or inner edge regions spaced around the periphery of the sealing material are flanged at a preselectable angle, for example, in a direction essentially perpendicular to the sealing plane and the flanged outer and/or inner edge region or region are then compacted.

This task is achieved according to the invention in that to form the centering collar or centering collar sections a stipulated outer and/or inner edge region or several stipulated outer and/or inner edge regions spaced around the periphery of a seal initially present in a prefabricated state, especially in the form of a perforated disk, is (are) flanged at a preselectable angle, for example, in a direction essentially perpendicular to the sealing plane and the flanged outer and/or inner edge region(s) is (are) then compacted.

Compaction of the flanged outer and/or inner edge region (regions) preferably occurs by applying mechanical pressure to the sealing material, during which, however, compaction can also additionally and simultaneously occur by applying heat to this sealing material.

It is particularly advantageous if the flanged outer and/or inner edge region(s) is (are) compacted to a multiple of the density of the material of the overall seal.

It is also advantageous within the scope of the process according to the invention if polytetrafluoroethylene (PTFE) is used as sealing material for the entire seal.

It is particularly preferred that a multidirectionally expanded polytetrafluoroethylene (ePTFE) is used as sealing material. "Multidirectionally expanded" is understood to mean a process according to which the polytetrafluoroethylene is stretched simultaneously in a stipulated number of directions lying in a common x-y plane, but at least biaxially stretched, as already known. This type of process can therefore also be designated multiaxial stretching or expansion of polytetrafluoroethylene. In certain applications unidirectionally expanded PTFE can be used as sealing material instead of a multidirectionally expanded PTFE.

A perforated disk is initially punched out from the sealing material of the explained type, whereupon a stipulated outer edge region of this perforated disk is flanged in a direction essentially perpendicular to the sealing plane and then compacted. If, for example, multidirectionally expanded PTFE with a density of about 0.7 $g/cm^3$ is used as sealing material, then the resulting ring packing during use of the process according to the invention is provided with a flanged, compacted centering collar whose density is at least about 1.9 $g/cm^3$. In certain applications the density can be up to three times or more the density of the initial sealing material, for example, about 2.1 $g/cm^3$.

However, in certain applications other compaction ratios with reference to the flanged outer and/or inner edge region, i.e., the resulting centering collar, are also conceivable. An initial density of the starting material of about 0.7 $g/cm^3$ has been shown to be the best density, since a seal with this density is best adapted to the geometric shapes of the flange.

Finally, there is the possibility in the process according to the invention of making the resulting seal electrically conducting by filling the PTFE or ePTFE beforehand with electrically conducting particles, preferably graphite particles.

Another underlying objective of the present invention is to devise an improved apparatus for production of a seal, using a compactable sealing material, especially a fluoropolymer, to seal flanges, preferably matching flanges. In a preferred embodiment, the improved apparatus comprises an apparatus to produce a ring packing to seal flange connections for pipes, in which this seal is provided on the outer and/or inner periphery with a centering collar or with several centering collar sections spaced around the periphery, and especially an apparatus to execute the process according to the invention.

The apparatus according to the invention comprises:
a) a device to support and center the seal initially present in a prefabricated state, especially in the form of a perforated disk;

b) a device to flange a stipulated outer and/or inner edge region or several stipulated outer and/or inner edge regions spaced around the periphery of the seal and to compact the flanged outer and/or inner edge region (regions) using mechanical pressure, optionally also with additional and simultaneous application of heat;

c) a device to create relative movements between the device serving to support and center the seal, and the device serving to flange the stipulated outer and/or inner edge region of the seal and to compact the flanged region to run these consecutive processes of flanging and compaction to form the centering collar or centering collar sections.

According to another advantageous embodiment of the apparatus of the present invention, the device to support and center the seal initially present in a prefabricated state comprises a shaping and centering part designed as a punch with a base part and a plate-like support part, in which this shaping and centering part is elastically supported within a recess of a base part of the apparatus.

A spring, for example, a disk spring, is preferably arranged within the recess of the base part of the apparatus, on which the plate-like support part of the shaping and centering part is supported, whereas the base part of the shaping and centering part is mounted to move within a central hole of the base part.

The plate-like support part of the shaping and centering part can preferably be designed so that it has support surfaces to support and center the seal, in which a centering mandrel is provided above the support surfaces that can be moved within the apparatus relative to the shaping and centering part.

In the case of the last-mentioned embodiment of the apparatus the centering mandrel can preferably be rigidly fastened to an upper part of the apparatus on its end facing away from the shaping and centering part, whereas the centering mandrel can have a cavity in its interior in which a shoulder screw is arranged that supports a hold-down device on its end facing the shaping and centering part, which cooperates with the shaping and centering part supporting the seal.

According to another advantageous embodiment of the apparatus according to the invention it is prescribed that the device to flange the stipulated outer and/or inner edge region of the seal and to compact the flanged outer and/or inner edge region consists of four identical moveable jaws arranged in the form of circular sectors, which are positioned concentrically around the centering mandrel in a region between the base part and the upper part of the apparatus and have the surface configuration required to execute the consecutive processes of flanging and compaction on their sides facing the shaping and centering part.

This type of design is prescribed with particular advantage such that the four jaws can be moved for the flanging process initially in the axial direction of the apparatus downward and then in essentially the radial direction of the apparatus for the compaction process.

Moreover, the apparatus according to the invention can be designed so that the jaws mounted to move radially on the upper part of the apparatus can be moved in common with the centering mandrel rigidly attached to the upper part in the axial direction of the apparatus.

In this case each jaw can preferably have a conical outside, a flat, annular bottom connected to it, a cylindrical inside connected to it and a flat contact side connected to it on its side facing the shaping and centering part when viewed from the outside in in the radial direction of the apparatus.

This is an extremely favorable configuration of the side of the jaws of the flanging and compaction device facing the shaping and centering part for execution of the consecutive processes of flanging and compaction, i.e., to form the desired centering collar of the ring packing.

The base part of the apparatus preferably has a conical guide surface on a side facing the jaws, which is annular and cooperates with the corresponding conical outside of these jaws to create an essentially radially directed movement of the jaws.

The invention is further explained below with reference to practical examples, in which reference is made to the accompanying drawings.

BRIEF DESCRIPTION OF THE DRAWINGS

FIG. 12 schematically depicts another variant of a ring packing in cross section (section according to XIII—XIII in FIG. 13);

FIG. 13 shows a view of the ring packing according to FIG. 12 in the direction of arrow $PF_3$ according to FIG. 12;

FIG. 14 schematically depicts another variant of a ring packing in cross section (section according to XV—XV in FIG. 15);

FIG. 15 shows a view of the ring packing according to FIG. 14 in the direction of arrow $PF_4$ according to FIG. 14.

DETAILED DESCRIPTION OF THE INVENTION

Figure 1:
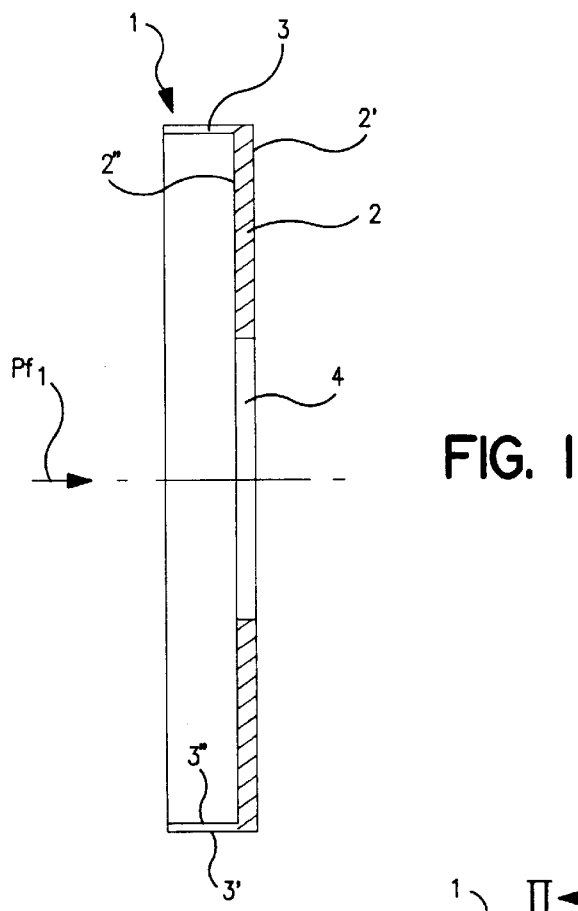
FIG. 1 shows a first variant of a ring packing in cross section (section along II—II of FIG. 2)

FIG. 1 schematically depicts a sectional view of the ring packing 1 for sealing of flange connections for pipes, in which this ring packing 1 is produced with the process according to the invention using a compactable sealing material, especially a multidirectionally expanded polytetrafluoroethylene (ePTFE). This sealing material is initially present in the form of punched out perforated disk, a stipulated outer edge region of which is flanged to a centering collar 3 and compacted, during which the flanging runs essentially in a direction perpendicular to the plane of the ring part 2 of ring packing 1. The chosen flanging angle in certain applications can also be 60° instead of 90° or assume other values. In the middle region of ring part 2 of ring packing 1 an opening 4 is punched out whose diameter corresponds to the inside diameter of the flange connection in which the ring packing 1 is ultimately incorporated. A practical example of such a flange connection for pipes is apparent from FIG. 8 and will be described further below in detail.

When, as already mentioned above, a multidirectionally expanded polytetrafluoroethylene is used as a starting material for the ring packing 1 whose density is about 0.7 $g/cm^3$, then in the course of executing the process according to the invention to produce this seal the corresponding flanged outer edge region provided to form the centering collar 3 is compacted, for example, to about 1.9 $g/cm^3$, and under certain circumstances even to about three times or more the density of the starting material, i.e., to a density of about 2.1 $g/cm^3$.

The density of the even, flat ring part 2 of the ring packing 1 initially remains unchanged, but during incorporation of the ring packing in the region of the flange connection a compaction of this ring part to a density of about 1.9 $g/cm^3$ or 2.1 $g/cm^3$ is also produced during mutual pressing together of the abutting flanges.

Figure 2:
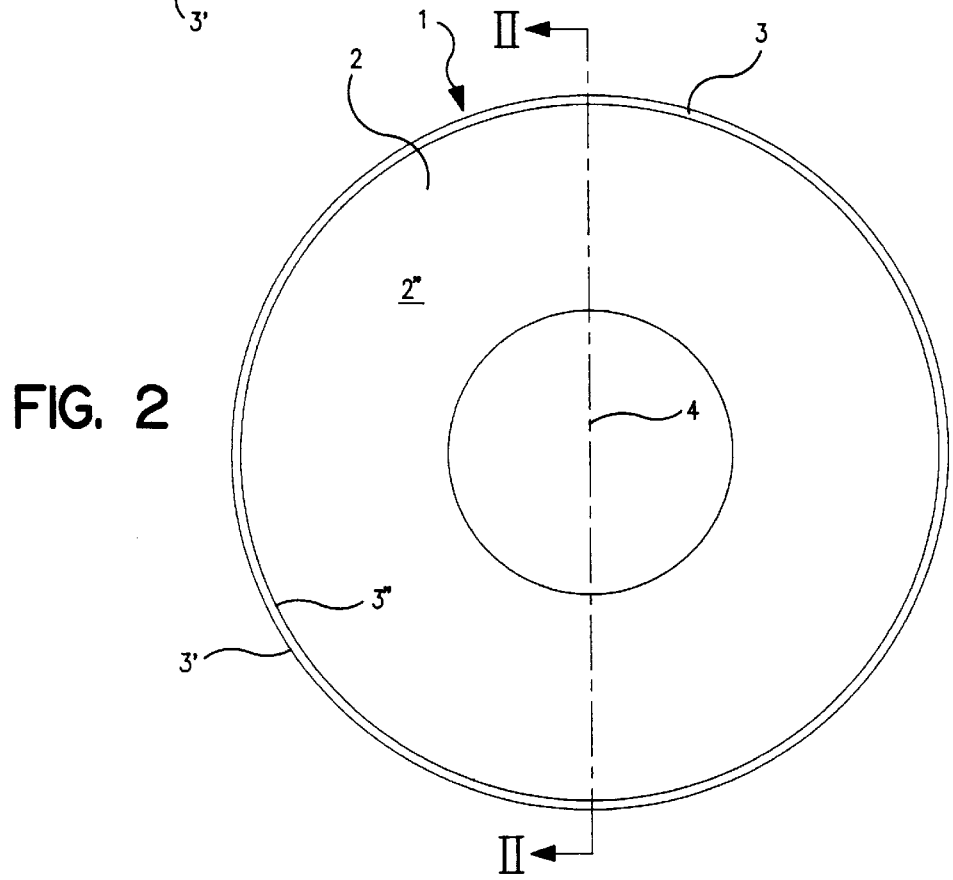
FIG. 2 shows a view of the ring packing according to FIG. 1 in the direction of arrow $PF_1$ according to FIG. 1.

It is further apparent from FIGS. 1 and 2 that the ring part 2 of ring packing 1 has a flat first surface 2, as well as a flat second surface 2, whereas the centering collar 3 has a first annular surface 3 and a second annular surface 3.

Figure 3:
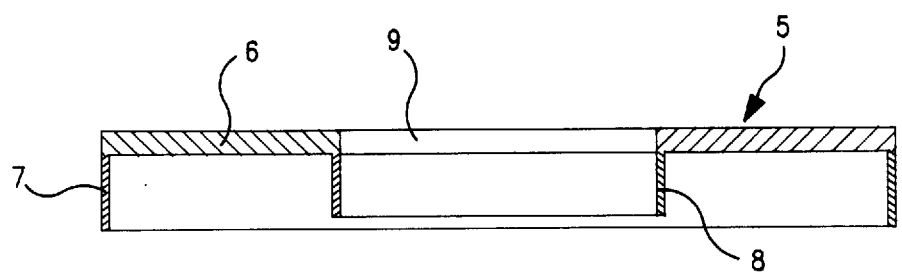
FIG. 3 schematically depicts another variant of a ring packing in cross section corresponding to the section according to FIG. 1.

Another practical example of the ring packing follows from FIG. 3. In this case the ring packing 5 has both a first centering collar 7 on its outer periphery and a second centering collar 8 on its inner periphery, in which the centering collars 7 and 8 in this case were produced by a process of flanging a corresponding outer edge region or a corresponding inner edge region of the seal initially present in the form of a perforated disk in a direction essentially perpendicular to the sealing plane of ring packing 5, whereas the corresponding flanged outer and inner edge regions were then compacted in the same manner as already explained with reference to the ring packing depicted in FIGS. 1 and 2. The ring packing 5 according to FIG. 3 also has a ring part 6 that remains after flanging of the two outer and inner edge regions and surrounds a center opening 9 of the ring packing 5.

Figure 4:
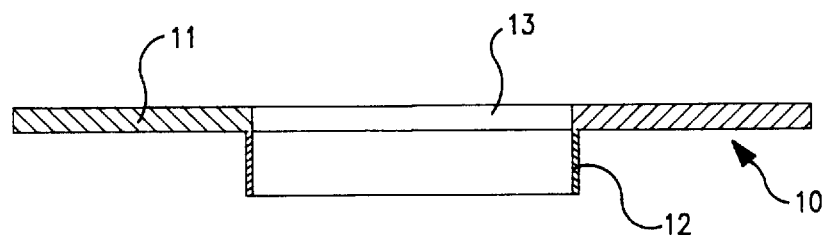
FIG. 4 shows still another variant of a ring packing in cross section corresponding to the section according to FIG. 1.

Another practical example of a ring packing 10 follows from FIG. 4, which differs from the practical example according to FIG. 3 in that only an inner edge region of the seal initially present in the form of a perforated disk was flanged and compacted to form a centering collar 12. A multidirectionally expanded polytetrafluoroethylene is preferably also used as starting material for the ring packing 10, in which the density of the ring part 11 of ring packing 10 remains unchanged at about 0.7 $g/cm^3$ during the production process, whereas the centering collar 12 is compacted to about three times the density, i.e., to a density of about 2.1 $g/cm^3$. The ring packing 10 according to FIG. 2 also has a center opening 12 corresponding to the center opening 9 of the ring packing 5 according to FIG. 3, in which case the inside diameter of opening 9 or 13 is somewhat smaller than the inside diameter of the resulting pipe flange connection.

As already explained above, the ring packings according to the practical examples of FIGS. 1 to 4 are preferably produced from a multidirectionally expanded polytetrafluoroethylene so that in all practical examples of ring packings 1 and 5 and 10 a soft, adaptable sealing region is produced in the region of the corresponding ring parts 2 and 6 and 11, whereas exact centering of the corresponding seal in the region of the resulting flange connection is guaranteed owing to the centering collars 3 and 7 and 8 and 12.

Figure 8:
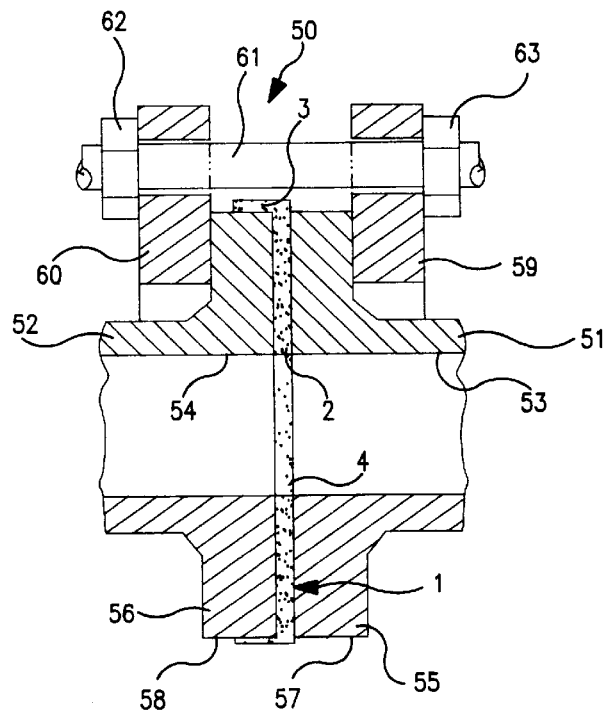
FIG. 8 shows a schematic view of a flange connection for pipes using a ring packing according to the invention.
Figure 9:
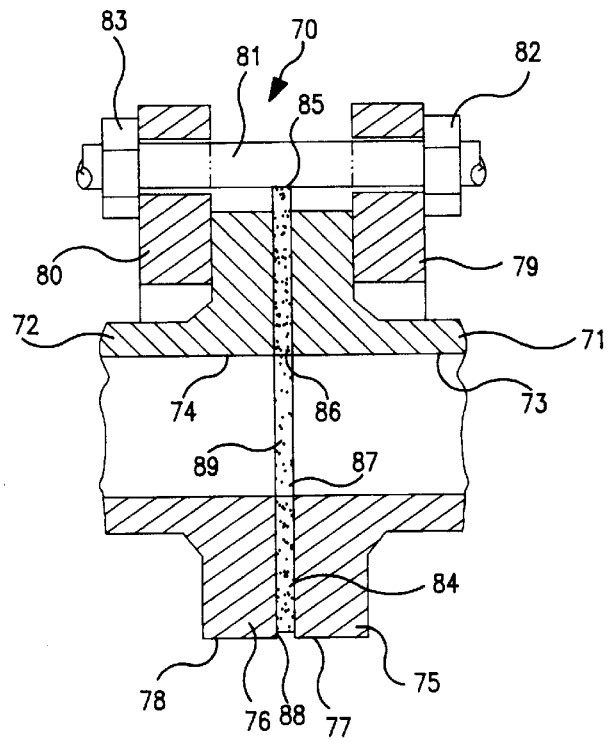
FIG. 9 shows a schematic view of a flange connection for pipes using a seal according to the prior art.

A practical example of this type of flange connection 50 is apparent from FIG. 8 in which a ring packing I is used according to FIGS. 1 and 2. The flange connection 50 according to FIG. 8 has a first pipe element 51 with a cylindrical inside periphery 53, as well as a second pipe element 52 with a corresponding cylindrical inside periphery 54. The first pipe element 51 is provided with a first pipe flange 55, whereas the second pipe element 52 is provided with a corresponding second pipe flange 56. The ring packing 1 according to FIG. 1 is incorporated between the first pipe flange 55 and the second pipe flange 56 so that the ring part 2 of ring packing 1 comes to lie precisely in the intermediate space between the two pipe flanges 55 and 56 facing each other, whereas the centering collar 3 of ring packing 1 in the orientation of ring packing 1 shown in FIG. 8 lies tightly against the outer periphery 58 of pipe flange 56. Naturally the orientation of the ring packing 1 could also be in the opposite direction so that the centering collar 3 of ring packing 1 lies accordingly against the outer periphery 57 of pipe flange 55. in each case it is guaranteed that centering of ring packing 1 occurs directly on flange 56 or flange 55 with the result that no dead spaces are produced either in the region of the outer periphery or in the region of the inner periphery of the resulting flange connection and it is further guaranteed in the variant according to FIG. 8 that no protrusion of the ring packing into the inside diameter of the resulting flange connection occurs, in complete contrast to a flange connection according to the prior art, as further explained above with reference to FIG. 9.

It is further pointed out in this connection that in this type of flange connection according to the prior art the dead space 88 can be so large that the plane-parallelism of the two flanges is compromised, which ultimately could lead to tilting of the pipe. This type of shortcoming can also be fully avoided based on the seal designed according to the invention.

Exact centering of the ring packing 1 in the region of the flange connection 50 according to FIG. 8, as already explained, is guaranteed by the fact that the ring packing I is provided with a centering collar that consists of a sealing material that is compacted to a multiple of the density of the starting material for ring packing 1. In the course of installation of flange connection 50 according to FIG. 8 mutual pressing together of the pipe flanges 55 and 56 being sealed occurs so that a first pressure disk 59 connected to the first pipe flange 55 and a second pressure disk 60 connected to the second pipe flange 56 are provided in the region of this flange connection 50, in which these pressure disks 59 and 60 are joined rigidly by means of a clamping bolt 61, in which a first nut 62 is screwed onto one end of the clamping bolt 61 and a second nut 63 is screwed onto the opposite end of clamping bolt 61. In the course of mutual pressing together of pipe flanges 55 and 56 compaction of the material of ring part 2 of ring packing 1 occurs so that compaction to a multiple relative to the starting material also occurs, the result being that the ring part 2 acquires the same density as the centering collar 3.

A practical example of an apparatus designed according to the invention to produce a ring packing for sealing of flange connections for pipes, for example, glass pipes, is now explained in detail with reference to FIGS. 5, 6 and 7. This apparatus 20 essentially consists of a lower, plate-like base part 22, a shaping and centering part 21 arranged above a center region of base part 22 to support and center the ring packing initially present in a prefabricated state, especially in the form of a perforated disk, made from a sealing material 24, a device arranged on it in the axial direction above the shaping and centering part 21 for flanging of a stipulated outer edge region of sealing material 24 and for subsequent compaction of the flanged outer edge region of the sealing material 24, as well as an upper part 25 arranged directly above device 23, which in turn has an inner region 27, as well as an outer region 29. Moreover, the apparatus 20 has a device (not shown separately) for creation of relative movements between the shaping and centering part 21 and the device 23 for running of the consecutive processes of flanging and compaction of the sealing material 24 (to be further explained in detail below) to form the centering collar 3 of the resulting ring packing 1, as already shown with reference to FIG. 1.

The shaping and centering part 21 designed essentially punch-like has a base part 39 as well as a plate-like support part 49, in which this shaping and centering part 21 is elastically supported within a recess 40 of base part 22. For this purpose a disk spring 30 is arranged within the recess 40 of base part 22, on which the plate-like support part 49 of the shaping and centering part 21 is supported. On the other hand, the base part 39 of the shaping and centering part 21 is mounted to move within a central hole 38 of base part 22.

Moreover, the plate-like support part 39 of the shaping and centering part 21 has a flat support surface 48 to support and center the ring packing 1 to be formed from the sealing material 24 and a cylindrical outside 45.

The apparatus 20 also has a centering mandrel 34 above the shaping and centering part 21, more precisely, above the flat, support surface 48, which can be moved within apparatus 20 relative to the shaping and centering part 21.

This centering mandrel 34 is rigidly attached to upper part 25 on its end facing away from the shaping and centering part 21, whereas the centering mandrel 34 has a cavity 34' in the interior of which a shoulder screw 32 is arranged.

This shoulder screw 32 carries a hold-down device 26 on its end facing the shaping and centering part 21, which cooperates with the shaping and centering part 21 carrying the ring packing 1. During execution of the flanging and compaction processes this hold-down device 26 comes into direct contact on the surface of ring packing 1, as is particularly apparent from FIG. 6.

The device for flanging of a stipulated outer edge region of ring packing 1 and for subsequent compaction of this flanged outer edge region consists essentially of four identical, sector-like, circularly arranged, moveable jaws 23 (cf. FIG. 7) that are positioned concentrically around the centering mandrel 34 in a region between the base part 22 and the upper part 25 of apparatus 20 and have the surface configuration required to execute the consecutive processes of flanging and compaction on their corresponding sides facing the shaping and centering part 21. In particular, each jaw 23 has a conical outside 41, a flat and annular bottom 35 connected to it, a cylindrical inside 42 connected to it, as well as a flat contact side 37 connected to it on its side facing the shaping and centering part 21, when seen from the outside in in the radial direction of apparatus 20. This contact side 37 comes into direct contact on hold-down device 26 when flanging and compaction of the stipulated outer edge region of the sealing material 24 occurs. At the same time, the cylindrical inside 42 of jaws 23 cooperates with the cylindrical outside 45 of the plate-like support part 49.

The jaws 23 for the process of flanging initially move in the axial direction of apparatus 20 downward in the direction toward the shaping and centering part 21 and then for the compaction process move in essentially the radial direction of apparatus 20.

In this case the annular, flat bottom 35 of jaws 23 serves in particular for flanging of the sealing material 24, whereas, on the other hand, the cylindrical inside 45 of jaws 23 is used for the process of compaction of the flanged edge region, which is pressed against the cylindrical outside 45 for the plate-like support part 49.

The jaws 23 mounted to move essentially radially on the upper part 25 of the apparatus are moveable jointly with the centering mandrel 34 rigidly attached to upper part 25 in the axial direction of apparatus 20.

Moreover, each jaw 23 is connected to the upper part 25 of apparatus 20 on its side facing away from the shaping and centering part 21 by means of a compression spring 33 arranged in an internal space 47 between the upper part 25 and the jaw 23, for example, in the form of a rubber spring or coil spring.

Finally, the centering mandrel 34 is supported in a region facing hold-down device 26 on a compression spring 31 that is arranged within a hollow cylindrical recess of centering mandrel 34 and directly surrounds the shoulder screw 32.

Figure 5:
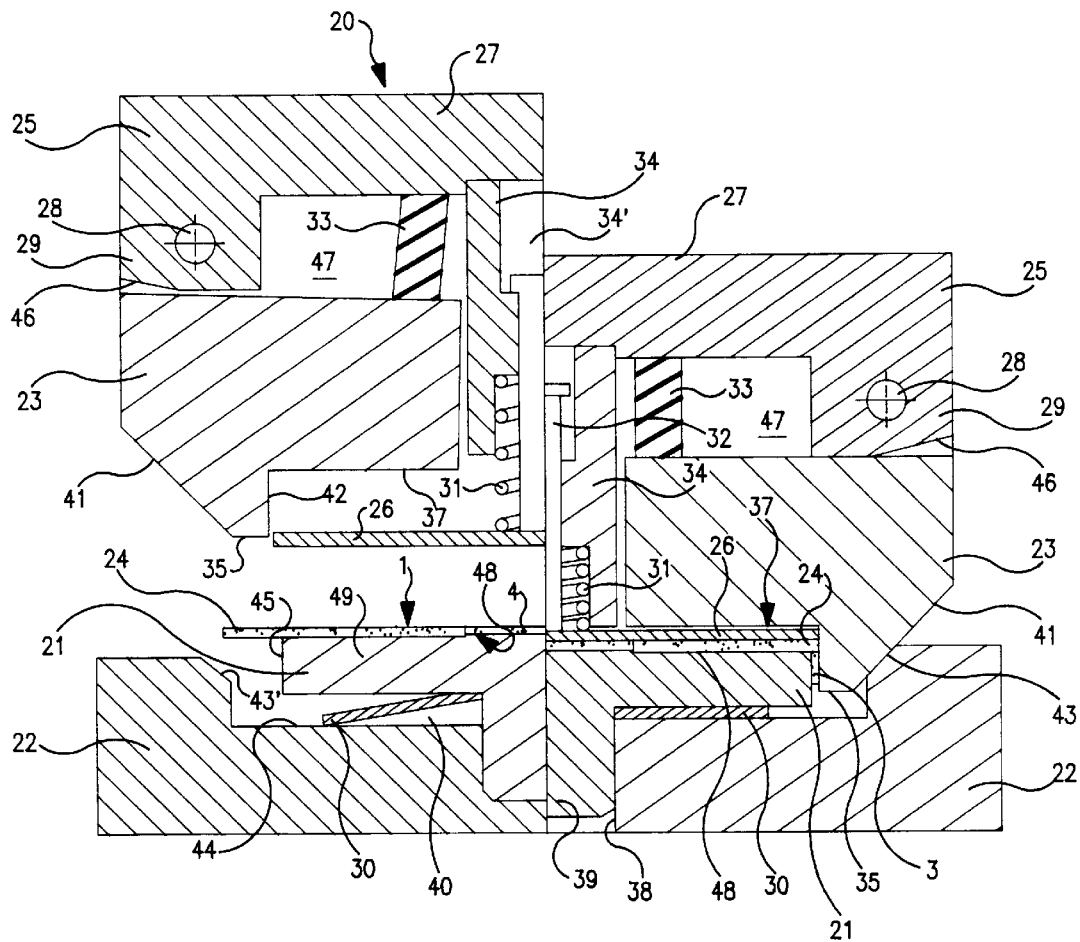
FIG. 5 schematically depicts a section of an apparatus for production of a ring packing to seal flange connections for pipes, in which the apparatus in the left half of FIG. 5 is shown in the opened state and in the right half of FIG. 5 is shown in the closed state.

As is apparent from the left half of FIG. 5, the upper part 25 is initially moved jointly with the four jaws 23 in the centering mandrel 34 as well as with the hold-down device 26 in the axial direction upward for the purpose of introducing the sealing material 24 into apparatus 20, more precisely, for the purpose of applying the sealing material 24 to the (for example, flat) support surface 48 of the shaping and centering part 21, so that the shaping and centering part 21 is freely accessible. At the same time, the shaping and centering part 21 is shifted upward by a certain amount in the axial direction as a result of the effect of disk spring 30.

As is also apparent from the left half of FIG. 5, the jaws 23 are displaced outward during the process by a certain amount simultaneously with the axially upward directed displacement, during which the upper part 25 has a slope 46 facing the corresponding jaw 23 for this movement process. It is further apparent from FIGS. 5 and 7 that the upper parts 25 of apparatus 20 cooperating with the corresponding jaws 23 are each provided with an alignment pin 28 in the region of their outer region 29. As already explained above, the four jaws 23 are shifted in the radial direction by a certain amount inward for compaction of the flanged outer edge region of sealing material, during which the base part 22 of the apparatus 20 has an annular, conical guide surface 43 on a side facing jaws 23 for this purpose, which cooperates with their corresponding conical outsides 41 to create the essentially radially directed movement of jaws 23.

Figure 7:
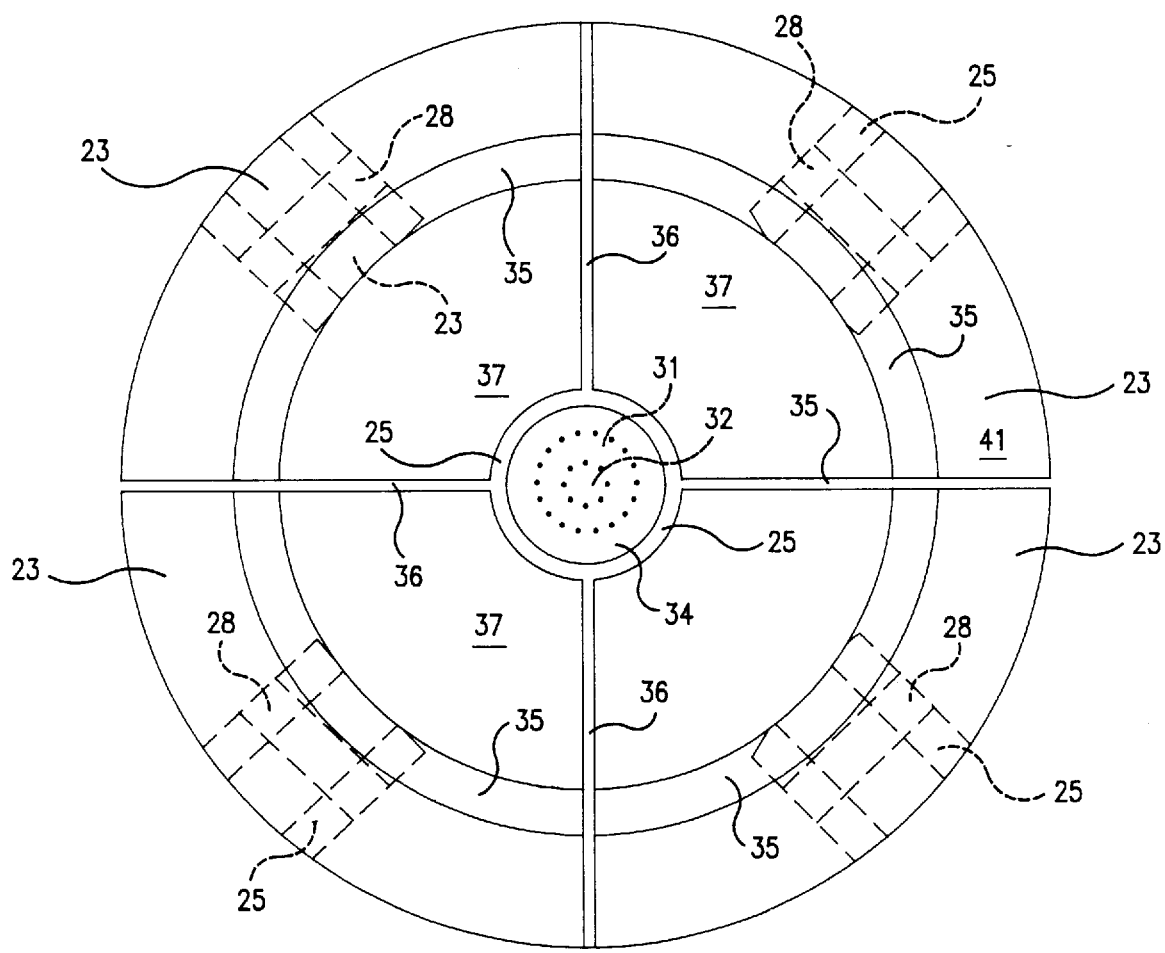
FIG. 7 shows a partial view of the apparatus depicted in FIG. 6 in direction VI—VI according to FIG. 6.

It is also apparent from FIG. 7 that an elongated gap 36 extending in the radial direction is present between each two adjacent jaws 23. It is further apparent from FIG. 5 that to support the disk spring 30 within recess 40 of base part 22 this has a lower support surface 44 (cf. left half of FIG. 5), in which the disk spring 30 lies tightly against the support surface 44 when apparatus 20 is completely closed, as can be seen in the right half of FIG. 5, when the processes of flanging and compaction for the purpose of forming the centering collar 3 are fully completed.

Figure 6:
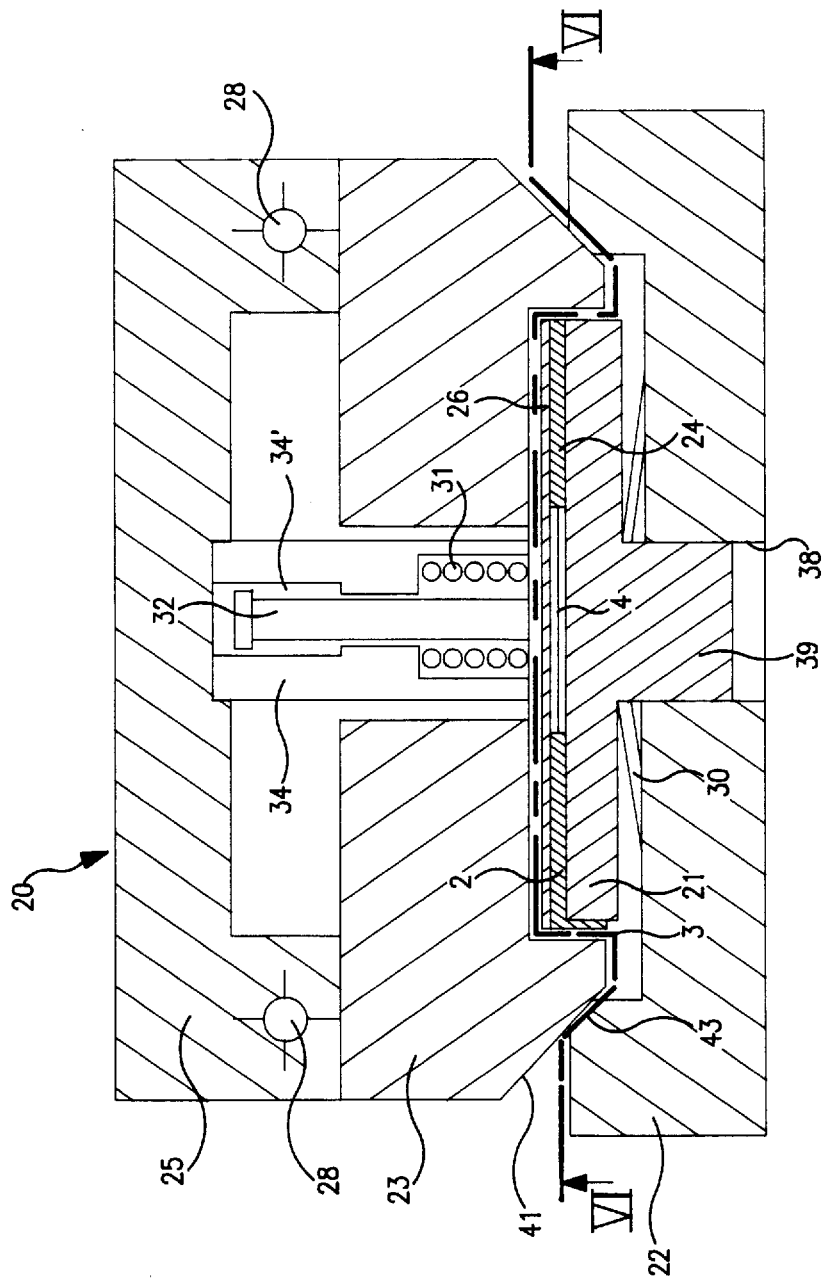
FIG. 6 shows a cross-sectional view corresponding to FIG. 5 of the apparatus in its closed state.

The desired dimension or size of the resulting seal can be changed or adjusted to the stipulated incorporation possibilities, for example, in a flange connection for pipes, by replacing both the shaping and centering part 21 and the hold-down device 26 in the apparatus depicted in FIGS. 5 to 7, and optionally by using additional segments (not shown in the drawings) in addition to the cylindrical inside 42 of jaws 23.

The finished ring packing 1 can then be removed from apparatus 20.

Corresponding additional preferred variants of ring packings for sealing flange connections for pipes produced according to the process of the invention are apparent from FIGS. 10 and 11 or 12 and 13 or 14 and 15.

Figure 10:
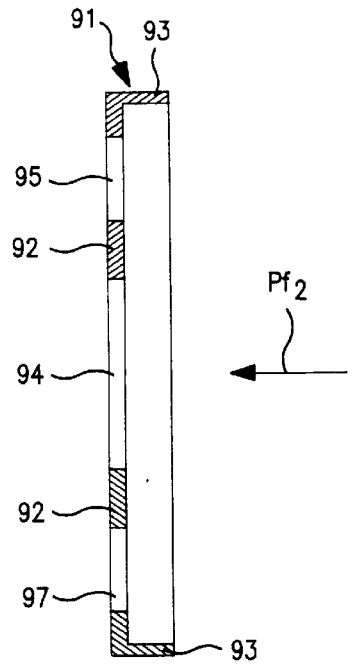
FIG. 10 schematically depicts another variant of a ring packing in cross section (section according to XI—XI of FIG. 11)
Figure 11:
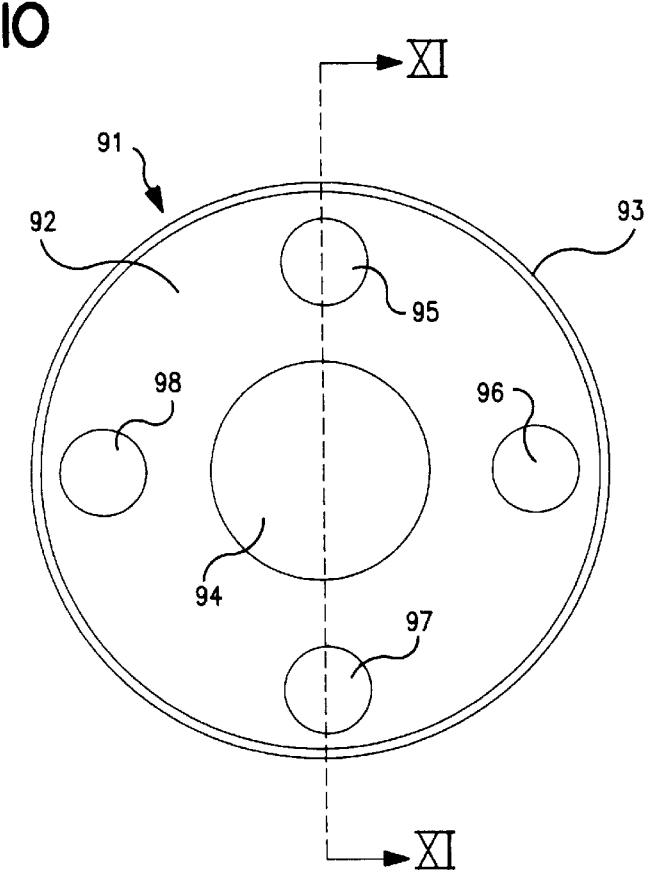
FIG. 11 shows a view of the ring packing according to FIG. 10 in the direction of arrow $PF_2$ according to FIG. 10.

In the practical example of a ring packing 91 according to FIGS. 10 and 11 the circumstance that in some applications the flange connection consists of two pipe flanges facing each other end to end that are connected with screwing is additionally allowed for. The ring packing 91 according to FIGS. 10 and 11 again has a disk-like ring part 92 in which a central, circular opening 94 is punched out and on whose outer periphery a flanged, compacted centering collar 93 is formed corresponding to the variant of a ring packing according to FIG. 1. In the case of a variant of a ring packing 91 according to FIGS. 10 and 11, however, it is additionally prescribed that its ring part 92 has a stipulated number of punched out, essentially circular holes 95, 96, 97, 98 in the region between opening 94 and the centering collar 93, which permit introduction of corresponding screws in the region of the prescribed flange connection, by means of which the abutting pipe flanges are screwed together. The number and layout of the holes 95, 96, 97, 98 provided in ring packing 91 naturally correspond to the number and layout of the holes formed in the corresponding pipe flanges.

The variant of a ring packing 105 according to FIGS. 12 and 13 is modified relative to the previously described variants to the extent that several centering collar sections 107, 108, 109 and 110 that are spaced around the periphery are formed on the ring packing 105 instead of a flanged centering collar that runs continuously around the entire outer edge region of the ring packing.

In the practical example according to FIGS. 12 and 13 a total of four shorter outer edge regions spaced around the periphery by roughly 90° of a ring part 106 of ring packing 105 were flanged in a direction essentially perpendicular to the sealing plane and then compacted. Instead of the four separate centering collar sections 107, 108, 109 and 110 depicted in FIG. 13, however, eight centering collar sections (or a selectable number) could be provided in a regularly spaced arrangement on the outer periphery of ring part 106 or ring packing 105. The central circular opening of ring packing 105 is designated 111. Spaced centering collar sections designed in this configuration or centering lips could, however, also be provided in the region of the inner edge of ring part 106 or ring packing 105, which is not shown in particular in the drawings.

In the practical example of a ring packing 201 according to FIGS. 14 and 15 an additional modification is finally prescribed relative to the previous variants to the extent that a ring part 202 of ring packing 201 is provided not only in the region of the outer edge with a flange and then compacted centering collar 203, but also an annular reinforcement region 205 is also formed in the region of the outer periphery of ring part 2 simultaneously with formation of centering collar 203, i.e, compaction of the annular reinforcement region 205 occurs, for example, simultaneously with compaction of the flanged outer edge region to form the centering collar 203.

A central punched out opening of ring packing 201 according to FIGS. 14 and 15 is designated 204. The variant of the ring packing 201 according to FIGS. 14 and 15 otherwise corresponds to that of FIGS. 1 and 2.

By means of the process according to the invention just explained a seal, especially a ring packing to seal flange connection for pipes can be produced to particular advantage, during which this ring packing has a flanged centering collar and is produced from one piece. In particular, the seal can be produced from a multidirectionally expanded polytetrafluoroethylene having a density of about 0.7 g/cm$^3$. In the course of compaction of the flanged centering collar this acquires a density of about 1.9 g/cm$^3$, optionally three times or more the density, i.e., a density of about 2.1 g/cm$^3$.

A seal produced with the process according to the invention from an expanded PTFE also exhibits universal chemical resistance, as well as temperature resistance in the range from −240° C. to +280° C. In addition, this type of seal also has the advantage that it is practically free of cold flow. Other materials are also conceivable for production of a seal according to the process of the invention, i.e., compactable sealing materials, for example, polyethylene, fiber materials or also rubber.

Different geometries of the resulting seals are conceivable, i.e., not only annular seals, but also overall or triangular, square or hexagonal seals or seals with other geometric configurations, different thicknesses and density are conceivable in principle.

I claim:

1. Process for production of a seal using a compactable sealing material comprising a fluoropolymer to seal flanges in a sealing plane, said flanges having an outer and/or inner periphery, in which the seal is provided on the outer and/or inner periphery with at least one centering collar section spaced around the periphery, wherein to form the at least one centering collar section, at least one of at least one stipulated outer region and at least one stipulated inner edge region spaced around the periphery of the seal is initially present in a prefabricated state, is flanged at an angle relative to the sealing plane, and the at least one of the at least one flanged outer region and the at least one flanged inner edge region is then compacted for providing a centering of the seal in the sealing plane of the flange.

2. The process of claim 1, wherein said at least one of said at least one stipulated outer region and at least one stipulated inner region is a perforated disk.

3. The process of claim 1, wherein said angle is in a direction perpendicular to the sealing plane.

4. Process according to claim 1, wherein the at least one flanged region is compacted by applying mechanical pressure to the sealing material.

5. Process according to claim 4, wherein the compaction further comprises simultaneously applying heat to the sealing material.

6. Process according to claim 1, wherein the at least one flanged outer region is compacted to a multiple of the density of the material of the entire seal.

7. Process according to claim 1, wherein polytetrafluoroethylene (PTFE) is used as the sealing material of the entire seal.

8. Process according to claim 7, wherein multidirectionally expanded polytetrafluoroethylene (ePTFE) is used as the sealing material for the entire seal.

9. Process according to claim 8, wherein the ePTFE is filled beforehand with electrically conducting particles in order to make the resulting seal electrically conducting.

10. Process according to claim 9, wherein the electrically conducting particles comprise graphite particles.

11. Process according to claim 7, wherein the PTFE is filled beforehand with electrically conducting particles in order to make the resulting seal electrically conducting.

12. Process according to claim 11, wherein the electrically conducting particles comprise graphite particles.

* * * * *